United States Patent [19]

Kolberg

[11] Patent Number: 5,305,800
[45] Date of Patent: Apr. 26, 1994

[54] FLEXIBLE HOSE OF TUBE

[75] Inventor: Lothar Kolberg, Norderstedt, Fed. Rep. of Germany

[73] Assignee: ITW-ATECO GmbH, Norderstedt, Fed. Rep. of Germany

[21] Appl. No.: 791,685

[22] Filed: Nov. 14, 1991

[30] Foreign Application Priority Data

Apr. 13, 1991 [DE] Fed. Rep. of Germany ....... 4112211

[51] Int. Cl.$^5$ ............................................. F16L 11/11
[52] U.S. Cl. ................................. 138/121; 138/118; 138/110; 138/172; 138/173
[58] Field of Search .............. 138/118, 110, 121, 172, 138/173; 181/207, 208

[56] References Cited

U.S. PATENT DOCUMENTS

| | | | |
|---|---|---|---|
| D. 307,174 | 4/1990 | Bjorkman et al. | 138/121 |
| 2,406,838 | 9/1946 | Kepler | 138/121 |
| 3,858,615 | 1/1975 | Weigl | 138/121 |
| 3,891,007 | 6/1975 | Kleykamp | 138/121 |
| 3,946,343 | 3/1976 | Vilkaitis | 138/121 |
| 3,993,060 | 11/1976 | Mitchell | 138/121 |
| 4,079,757 | 3/1978 | Fischer et al. | 138/121 |
| 4,690,174 | 9/1987 | Järvenkylä | 138/121 |
| 4,712,642 | 12/1987 | Lalikos et al. | 181/207 |
| 4,921,147 | 5/1990 | Poirier | 138/121 |
| 5,060,697 | 10/1991 | Weinheimer | 138/121 |

FOREIGN PATENT DOCUMENTS 0256191 2/1927 United Kingdom ............... 138/173

*Primary Examiner*—Stephen F. Gerrity
*Assistant Examiner*—James F. Hook
*Attorney, Agent, or Firm*—Schwartz & Weinrieb

[57] ABSTRACT

Flexible hose or tube comprises a hose body and a plurality of ribs extending radially outwardly from the outer periphery of the hose body. The ribs are of annular shape and are axially spaced with respect to each other. The hose body wall is of relatively small thickness as compared to the thickness of the ribs. The hose may be integrally made from a thermoplastic caoutschuc or rubber and exhibits a high degree of flexibility due to its relative softness, while the shape and structure of the ribs provide a high degree of resistance against lateral bending or buckling of the tube.

21 Claims, 2 Drawing Sheets

FLEXIBLE HOSE OF TUBE

FIELD OF THE INVENTION

The present invention relates generally to a flexible hose or tube, and more particularly to a flexible hose or tube which is particularly useful as a ventilation hose or the like to be installed within various vehicle compartments which may be characterized by means of limited spacing.

BACKGROUND OF THE INVENTION

Flexible hoses or tubes are disposed within various different types of apparatus and structures. While the more commonly used bellows are generally satisfactory with respect to duration and flexibility characteristics, the manufacture of the same is relatively expensive. Ventilation hoses normally employed within vehicles are generally made from soft PVC, however, due to their relative hardness they exhibit a substantial resistance to lateral bending, and exhibit only limited flexibility. A further disadvantage of these hoses resides in the fact that they produce chatter noises when they encounter vehicle parts.

German patent 39 29 051 (see equivalent U.S. Pat. No. 5,060,697) discloses a drainage or ventilation hose comprising a tubular hose body made of soft PVC and having axially spaced, radially extending ribs of chlorinated polyethylene, with the wall thickness of the ribs being relatively small as compared with that of the hose body. The ribs are coextruded along with the hose body. The ribs being relatively soft and having a Shore hardness of 55–65, noise silencing is good as compared to that of smooth PVC hoses and also with respect to ribbed PVC hoses, the ribs also being made from soft PVC.

Due to the inherent characteristics of the soft PVC, the wall of the hose body of this prior art hose only exhibits limited flexibility which cannot be increased by reducing the wall thickness because this would result in a poor resistance to lateral bending. The purpose of the ribs is to silence noises resulting from the hose encountering vehicles parts.

OBJECT OF THE INVENTION

It is an object of the present invention to provide a flexible hose or tube which exhibits a high degree of resistance to lateral bending or buckling and excellent flexibility, which is easy to manufacture and which does not generate audible noises when encountering other members.

SUMMARY OF THE INVENTION

In accordance with the plastic hose or tube of the present invention, annular and axially spaced ribs extend radially outwardly from the outer periphery of the tubular hose body. The wall of the hose body is relatively thin, that is its thickness is preferably equal to or less than that of the ribs resulting in excellent flexibility of the hose. The relatively thick annular ribs prevent undue lateral bending or buckling of the hose when the hose is bent or flexed through means of substantial angles.

When the hose of the present invention is bent or flexed, the thin-walled portions of the hose body wall defined between the ribs and disposed along the inner radius of curvature are deformed. The excellent resistance to buckling of the tube results from fact that the radial end portions of the axially spaced ribs substantially engage each other along an arcuate locus defined by means of relatively small radii.

Along the outer bending radius the hose body portions defined between the ribs are elongated resulting in a relatively smooth surface along the interior peripheral surface portion of the hose body and accordingly resulting in excellent flow characteristics when the hose is used as an air flow tube. Preferably the hose of the present invention may be mounted so as the assume the shape of arcs of more than 90°. Bends of 180° are even possible at small bending radii without the risk of buckling.

Preferably the hose is integrally formed from thermoplastic rubber or caoutschuc which preferably has a Shore hardness of approximately 60. As a result thereof the hose of the present invention is easy to manufacture, may be made from a unitary material, and does not generate any chatter noises due to its softness.

It was found that the following dimensions are particularly advantageous with respect to flexibility and resistance to buckling of the hose: the ratio of the radial height of the ribs to the inner diameter of the hose is within a range of 1:1 to 1:6, and preferably within the range of 1:2 to 1:3. Preferably the thickness of the ribs is approximately two or three times the thickness of the hose body wall portions defined between the ribs. The ratio of the axial spacing of the ribs to the inner diameter of the hose is preferably within a range of 1:2 to 1:8, and in particular from within the range of 1:3 to 1:5.

According to a further development of the present invention a transition region defined between the wall of the hose body and each one of the ribs is characterized by means of a small radius of curvature the amount of which preferably corresponds to the thickness of the hose body wall.

Furthermore the ribs are preferably characterized by means of a substantially flat rectangular cross section and taper slightly from their base toward their radial ends.

The above described shape and structure of the ribs at the outer periphery of the hose body and the material used for manufacturing the hose ensures ease of handling and slidability of the hose which are important when, for example, such a hose is to be fitted into elongated cavities which are not easily accessible.

The end portions of the hose of the present invention may be fabricated without ribs, and the hose body wall defined within this region may be of substantially greater thickness than the hose body wall portions defined between the ribs. In accordance with such a third embodiment of the present invention, a hose portion of increased thickness which precisely delimits the "buckling area" of the ribbed hose portion is disposed adjacent to a central area of the hose end portion so as to be interposed between the ribbed hose portion and the central area of the hose end portion, while the outermost end of the hose is formed as an annular bead. Such an end portion may be fitted, for example, onto a tube section and may be fixed by means of a connector engaging the central area. However, other shapes or connecting contours of the hose end portion may be provided adjacent to the flexible hose portion.

BRIEF DESCRIPTION OF THE DRAWINGS

Various other objects, features, and attendant advantages of the present invention will be better understood from the following detailed description, when considered in connection with the accompanying drawings, in which like reference characters designate like or corresponding parts throughout the several views, and wherein.

DETAILED DESCRIPTION OF THE PREFERRED EMBODIMENT

Figure 1:
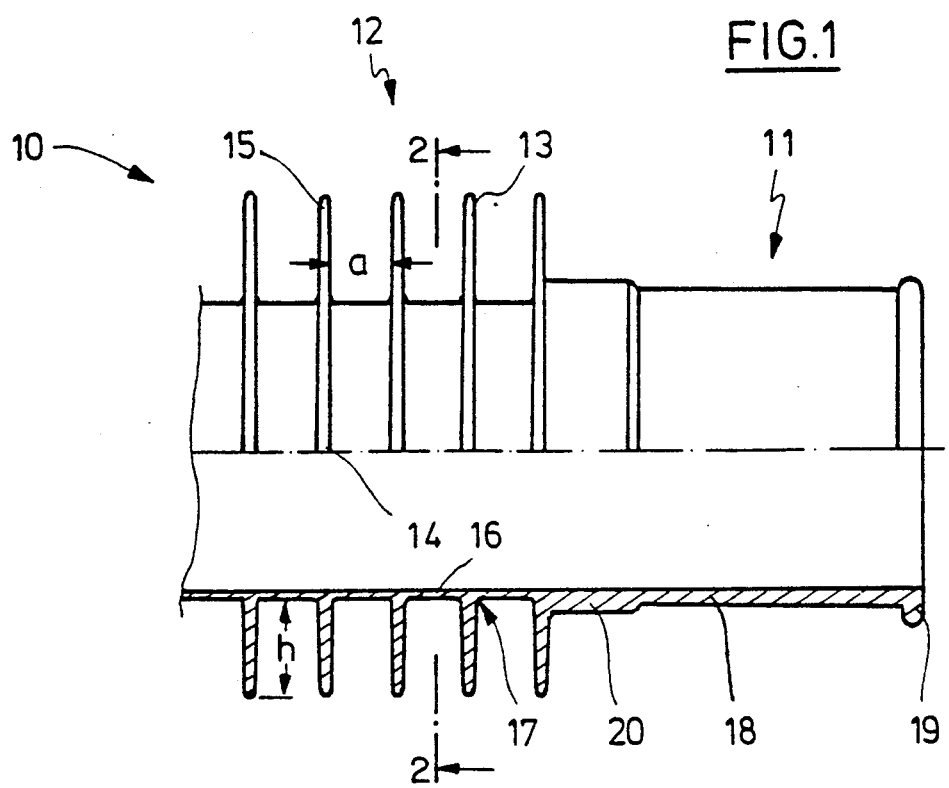
FIG. 1 is a side elevation, partly in cross section, of a flexible hose of the present invention.

In FIG. 1 a flexible hose 10 comprises a ribless end portion 11 and a ribbed portion 12. In ribbed portion 12 axially spaced annular ribs 13 are formed along the outer periphery of the hose body. Ribs 13 are characterized by means of a flat rectangular cross section and taper slightly from a base 14 having a thickness of approximately 1.5 mm toward the radial end 15 having a thickness of approximately 1.0 mm. The hose body wall 16 defined between ribs 13 and having a wall thickness of approximately 0.5 mm is relatively thin as compared to the thickness of the ribs, the radius of curverture 17 of the transition area defined between the hose body wall 16 and the ribs 13 being about 0.5 mm.

Figure 2:
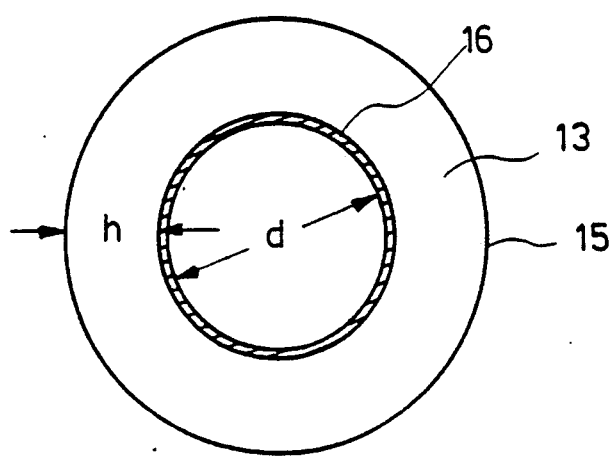
FIG. 2 is a cross section of the hose of FIG. 1 along lines 2—2 in FIG. 1.

The spacing a defined between adjacent ribs is approximately 8 mm while the radial height h of the ribs is approximately 12 to 14 mm and the inner diameter d of the hose is approximately 30 mm (FIG. 2).

The ribless end portion 11 of hose 10 has a central area 18 having a wall thickness of approximately 1.5 mm, an outer annular bead 19, and a transition area 20 adjacent ribbed portion 12 of the hose, the wall thickness of annular bead 19 and of transition area 20 being approximately 0.5 to 2 mm in excess of that of the central area 18. The transition area 20 delimits the bendable area of the hose.

When hose 10 has been mounted upon a tubular member, the hose may be secured by means of a connector which surrounds and engages the central area 18 of the end portion 11 of the hose.

Figure 3:
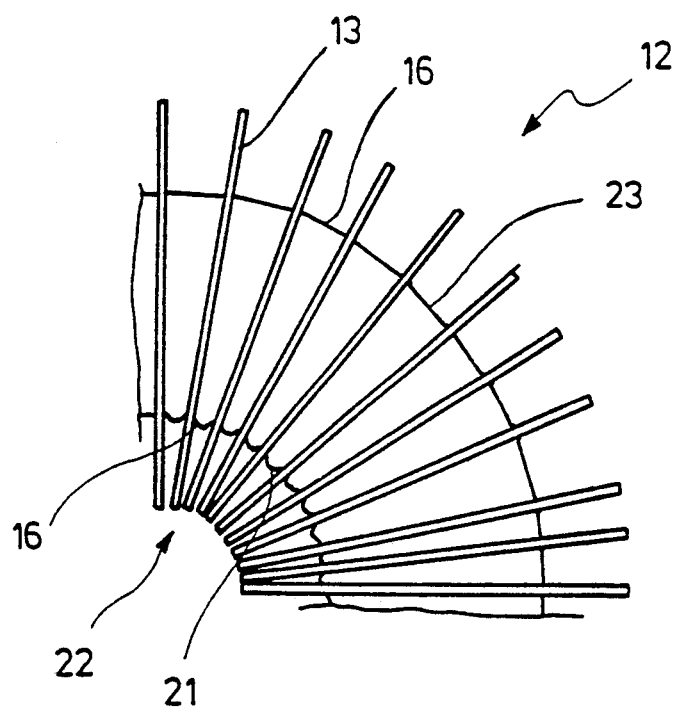
FIG. 3 is a side elevation of the ribbed area of the hose in FIG. 1 in a bent condition.

FIG. 3 shows the disposition or orientation of the ribs 13 of the ribbed portion 12 when the hose has been bent through an angle of approximately 90°. Along the inner bending radius 21, the ends of ribs 13 almost engage each other (as indicated by means of the arrow 22), while the thin-walled hose body wall 16 has been deformed outwardly towards the ends of the ribs.

At the outer bending radius 23, the hose body wall portions defined between the ribs has been expanded so that the interior peripheral surface of the hose body wall within the vicinity of the greater bending radius 23 forms a relatively smooth continuous surface resulting in excellent flow characteristics for the hose.

The hose shown in FIGS. 1 to 3 is integrally made from thermoplastic caoutschuc having a Shore hardness of approximately 60. The hose having the features shown in the Figures exhibits a high degree of flexibility and a high degree of resistance against buckling; nevertheless the hose is easy to manufacture. Furthermore the ribs due to their shape, structure and softness, do not obstruct nor impede assembly of the hose.

Obviously, many modifications and variations of the present invention are possible in light of the above teachings. It is therefore to be understood that within the scope of the appended claims, the present invention may be practiced otherwise than as specifically described herein.

I claim:

1. A flexible hose, comprising:
   a hose body fabricated from a plastic material and comprising a fluid conduit through which a fluid can be conducted and defining an interior fluid passageway extending along a longitudinal axis and defined by an interior peripheral wall surface of said hose body having a predetermined radial extend; and
   a plurality of axially spaced, radially extending, annular ribs disposed around outer peripheral surface portions of said hose body;
   each one of said plurality of ribs having a predetermined radial extend h extending radially outwardly from each one of said outer peripheral surface portions of said hose body, a predetermined axial thickness t, and a predetermined axial spacing a defined between successive ones of said plurality of axially spaced ribs;
   wherein the ratio of said radial extent h of each one of said plurality of ribs with respect to said axial thickness t of each one of said plurality of ribs is approximately 10:1, and the ratio of said radial extent h of each one of said plurality of ribs with respect to said axial spacing a defined between successive ones of said plurality of axially spaced ribs is approximately 1.5:1 such that said hose body can be bent through a predetermined angle at which radially outermost portions of said plurality of axially spaced ribs engage each other so as to limit the angular bending of said hose body as a result of which said fluid is able to be conducted through said fluid conduit with excellent flow characteristics.

2. Hose according to claim 1, characterized in that the hose body and the ribs are integrally formed.

3. Hose according to claim 1, being characterized in that said hose is made of thermoplastic rubber.

4. Hose according to claim 3, characterized in that the thermoplastic rubber has a Shore hardness of about 60.

5. Hose according to claim 1, wherein such is characterized in that the ratio of the radial height (h) of the ribs to the inner diameter (d) of the hose is within the range of 1:1 to 1:6.

6. Hose according to claim 1, wherein such is characterized in that the ratio of the distance (a) defined between the ribs to the inner diameter (d) of the hose is within the range of 1:2 to 1:8.

7. Hose according to claim 1, wherein such is characterized in that the thickness of the ribs (13) is about two to three times the amount of the thickness of wall (16) of the hose body between the ribs.

8. Hose according to claim 1, wherein such is characterized in that a transition corner region (17) located between the wall (16) of the hose body and each rib (13) is characterized by a small radius of curvature having an extent corresponding to the thickness of the hose wall.

9. Hose according to claim 1, wherein such is characterized in that the ribs (13) have an essentially flat rectangular cross section.

10. Hose according to claim 1, wherein:
    each one of said ribs (13) taper slightly from a base portion (14) disposed upon said hose body to a distal end portion (15), with the thickness of each rib at said base portion thereof being about 1.5 times the thickness of said distal end portion of said rib.

11. Hose according to claim 1, wherein:
at least one end portion (11) of the hose has no ribs and comprises an intermediate portion (18), an outer annular ring portion (19) integrally connected to a first outer end of said intermediate portion (18), and a transition portion (20) integrally connected to a second opposite, inner end of said intermediate portion (18) so as to integrally connect said intermediate portion (18) to said hose body (12) having said ribs (13) disposed thereon.

12. Hose according to claim 11, characterized in that the wall thickness of the intermediate portion (18) of the end portion (11) is larger than the wall thickness of the hose body (12) having said ribs, with the ratio of the wall thicknesses being (13) about 3:1.

13. A hose as set forth in claim 5, wherein:
said ratio is within the range of 1:2 to 1:3.

14. A hose as set forth in claim 6, wherein:
said ratio is within the range of 1:3 to 1:5.

15. A flexible hose, comprising:
a hose body fabricated from a plastic material and comprising a fluid conduit through which a fluid can be conducted and defining an interior fluid passageway extending along a longitudinal axis and defined by an interior peripheral wall surface of said hose body having a predetermined radial extent, said hose body having a predetermined wall thickness $t_1$; and
a plurality of axially spaced, radially extending, annular ribs disposed around outer peripheral surface portions of said hose body;
each one of said plurality of axially spaced ribs having a predetermined radial extent h extending radially outwardly from each one of said outer peripheral surface portions of said hose body, a predetermined axial thickness $t_2$, and a predetermined axial spacing a defined between successive ones of said plurality of axially spaced ribs;
wherein the ratio of said hose body wall thickness $t_1$ with respect to the internal diameter d of said hose body fluid conduit, the ratio of said radial extent h of each one of said plurality of axially spaced ribs with respect to said axial thickness $t_2$ of each one of said plurality of axially spaced ribs, and the ratio of said radial extend h of each one of said plurality of axially spaced ribs with respect to said axial spacing a defined between successive ones of said plurality of axially spaced ribs is such that when said hose body is bent through a predetermined angle at which radially outermost portions of said plurality of axially spaced ribs engage each other so as to limit the angular bending of said hose body, axially extending portions of said hose body, defined between said outer peripheral surface portions of said hose body upon which said axially spaced ribs are disposed, are deformed radially outwardly such that said fluid is able to be conducted through said fluid conduit with excellent flow characteristics.

16. A hose as set forth in claim 15, wherein:
said ratio of said hose body wall thickness $t_1$ with respect to said internal diameter d of said hose body fluid conduit is approximately 1:60.

17. A hose as set forth in claim 15, wherein:
said ratio of said radial extent h of each one of said plurality of axially spaced ribs with respect to said axial thickness $t_2$ of each one of said plurality of axially spaced ribs is approximately 10:1.

18. A hose as set forth in claim 15, wherein:
said ratio of said radial extent h of each one of said plurality of axially spaced ribs with respect to said axial spacing a defined between successive ones of said plurality of axially spaced ribs is approximately 1.5:1.

19. A hose as set forth in claim 15, further comprising:
a ribless end portion extending axially away from an end one of said plurality of axially spaced ribs and about which a connector can be disposed for mounting said hose upon a support; and
an annular bead portion integrally formed upon a distal end of said ribless end portion for axially retaining said connector upon said ribless end portion of said hose.

20. A hose as set forth in claim 15, wherein:
said hose body and said plurality of axially spaced ribs are integrally formed together.

21. A hose as set forth in claim 20, wherein:
said hose body and said plurality of axially spaced ribs are fabricated from thermoplastic rubber.

* * * * *